United States Patent
Stapf

[11] Patent Number: 5,924,757
[45] Date of Patent: Jul. 20, 1999

[54] REFUELING FLAP

[75] Inventor: Uwe Stapf, Röttingen, Germany

[73] Assignee: Itw-Ateco GmbH, Norderstedt, Germany

[21] Appl. No.: 09/092,018

[22] Filed: Jun. 5, 1998

[30] Foreign Application Priority Data

Jun. 23, 1997 [DE] Germany ............................ 297 10 918

[51] Int. Cl.⁶ ................................................. B62D 25/00
[52] U.S. Cl. ............................................ 296/97.22; 16/82
[58] Field of Search .............................. 296/97.22, 37.8, 296/37.12, 37.7; 361/681; 188/290, 82.1; 74/574; 16/82

[56] References Cited

U.S. PATENT DOCUMENTS

| 4,368,937 | 1/1983 | Palombo et al. | 296/37.7 |
| 4,426,752 | 1/1984 | Nakayama | 16/82 |
| 4,527,825 | 7/1985 | Clouse | 296/97.22 |
| 4,782,978 | 11/1988 | Appleby et al. | 296/97.22 |
| 4,811,984 | 3/1989 | Hempel | 296/97.22 |
| 4,893,522 | 1/1990 | Arawawa | 74/574 |
| 4,971,382 | 11/1990 | Ohno | 296/97.22 |
| 5,044,678 | 9/1991 | Detweiler | 296/97.22 |
| 5,090,521 | 2/1992 | Miura | 188/82.1 |
| 5,269,397 | 12/1993 | Kawamoto et al. | 188/290 |
| 5,275,456 | 1/1994 | Ihii et al. | 396/37.12 |
| 5,413,317 | 5/1995 | Spoerre | 296/37.8 |
| 5,437,491 | 8/1995 | Nedbal et al. | 296/97.22 |
| 5,625,533 | 4/1997 | Kim et al. | 361/681 |
| 5,664,811 | 9/1997 | Martus et al. | 296/97.22 |
| 5,673,958 | 10/1997 | Gramss . | |

Primary Examiner—Joseph D. Pape
Assistant Examiner—Kiran Patel
Attorney, Agent, or Firm—Schwartz & Weinrieb

[57] ABSTRACT

A refueling flap for a refueling trough on a vehicle body, wherein a damper is in operating connection with the refueling flap via a gear.

20 Claims, 2 Drawing Sheets

REFUELING FLAP

FIELD OF THE INVENTION

The present invention relates generally to a refueling flap and more particularly to a refueling cap which has operatively associated therewith a gear damper mechanism for controlling the movement of the refueling cap during its opening and closing movements.

BACKGROUND OF THE INVENTION

For refueling vehicles, a filling connection piece is usually provided whose opening for example, may be closed by means of a lockable turn-lock closure. The connection piece and closure for aesthetic reasons and in order to reduce the danger of injury are usually sunk into a refueling trough in the car body. The refueling trough is usually closable by means of a refueling flap and is thus hinged to the car body.

The design of the opening and closing mechanism varies with the known refueling flaps: the flap may be operated by hand and may be kept in the closed or open position by means of spring force. Another known refueling flap envisages a bar mechanism operable from the inner space of the vehicle by means of a pull wire, which lets the refueling flap flick open by means of a spring force as soon as the bar is actuated. This flap is then closed by hand so that the bar again clicks in and keeps the flap closed.

The opening and closing movement of these known refueling flaps is fast and abrupt when they are biased by a spring force, and also they act "rickety" when no spring is provided. By way of the fact that with the known spring guided embodiment form the flap flicks to the open or closed end position, corresponding abutment surfaces may wear. Furthermore irritating noises may be produced.

BRIEF OBJECT OF THE INVENTION

It is the object of the present invention to control the movememnt of a refueling flap.

SUMMARY OF THE INVENTION

According to the invention the flap movement for opening and/or closing a refueling flap for a refueling trough on a car body is dampened. For this a damper is provided which by means of a gear is in operating connection with the refueling flap.

Preferably the damper is a rotational damper which is filled with a viscous fluid. The shaft of such a known rotational damper may be in rotational connection with a pinion as part of the gear and the pinion may cooperate with a tooth segment as a further part of the gear. With this system or structure either the damper is stationary with respect to the car body and the tooth segment is fastened to the refueling flap or the tooth segment is stationary and the damper is fastened to the refueling flap. The refueling flap may be hinged by means of an arm in the refueling trough. On the arm either the tooth segment or the damper may be fastened. The tooth segment and the arm may be formed from one-piece which is particularly advantageous when manufacture of the components is achieved in accordance with the injection molding method.

By means of the refueling flap constructed according to the present invention the opening and closing movement of the flap may advantageously be slowed down. By means of suitable known direction-dependent dampers (one-way dampers) the refueling flap may also be designed such that according to requirements only the opening movement or the closing movement of the flap is dampened. The dampened or slowed movement of the flap has the effect with the user of a less "rickety", quality mechanism. With refueling flaps which are guided into the open or closed end position by means of a spring force the corresponding abutment surfaces according to the invention wear less with the refueling flap braked or dampened according to the invention, since by means of the slowed movement a flicking of the flap into the end position is advantageously prevented. With the refueling flap according to the invention even the spring force for keeping the refueling flap in the end positions may be eliminated with.

BRIEF DESCRIPTION OF THE DRAWINGS

A preferred embodiment form of the invention is hereinafter described by way of the attached drawings, in which like reference characters designate like or corresponding parts throughout the several views, and wherein.

DETAILED DESCRIPTION OF THE INVENTION

Figure 1:
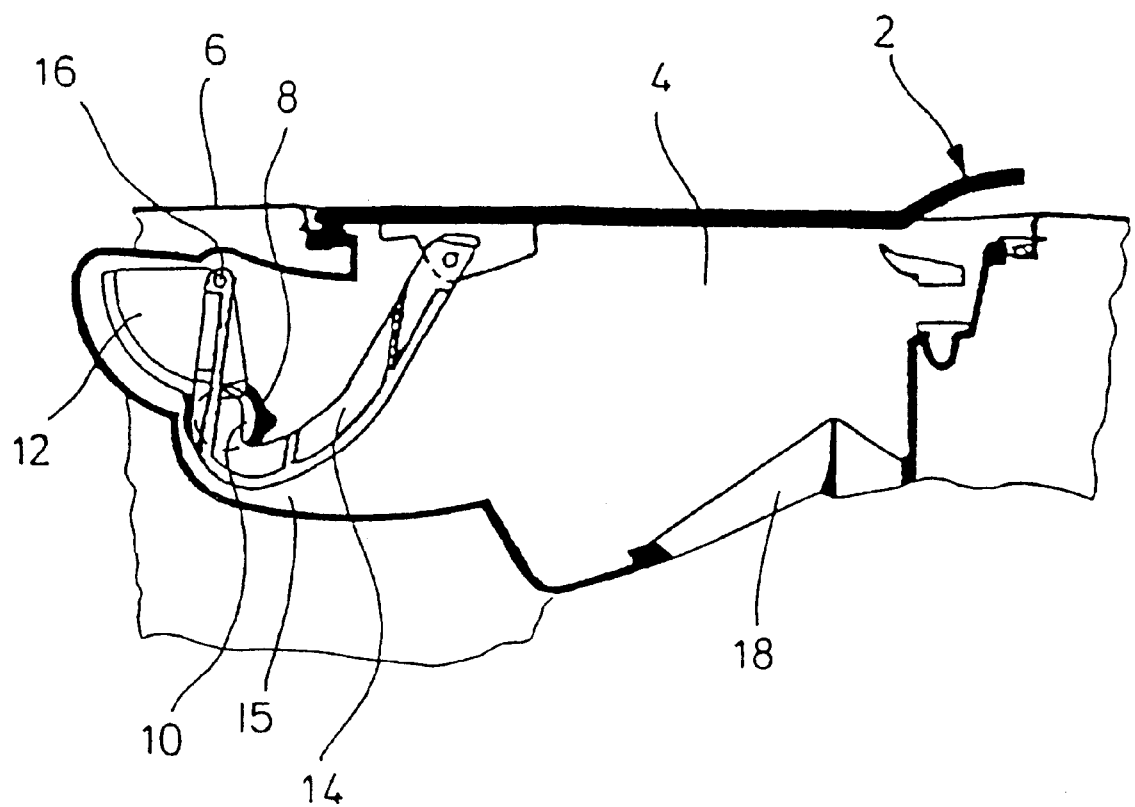
FIG. 1 is a sectioned lateral view of a refueling trough with a refueling flap according to the invention in the closed position.
Figure 2:
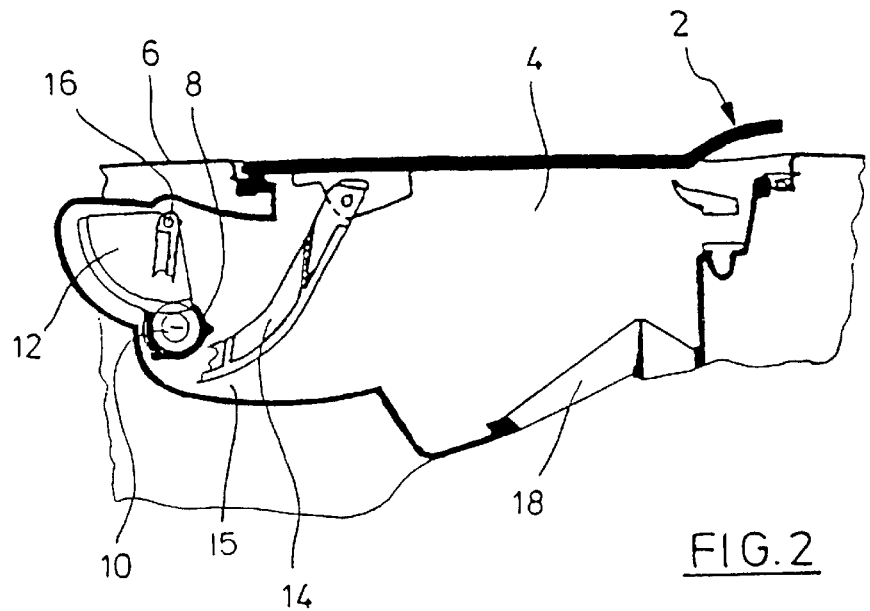
FIG. 2 is the same view as FIG. 1 with an additionally free-sectioned damper and pinion.
Figure 3:
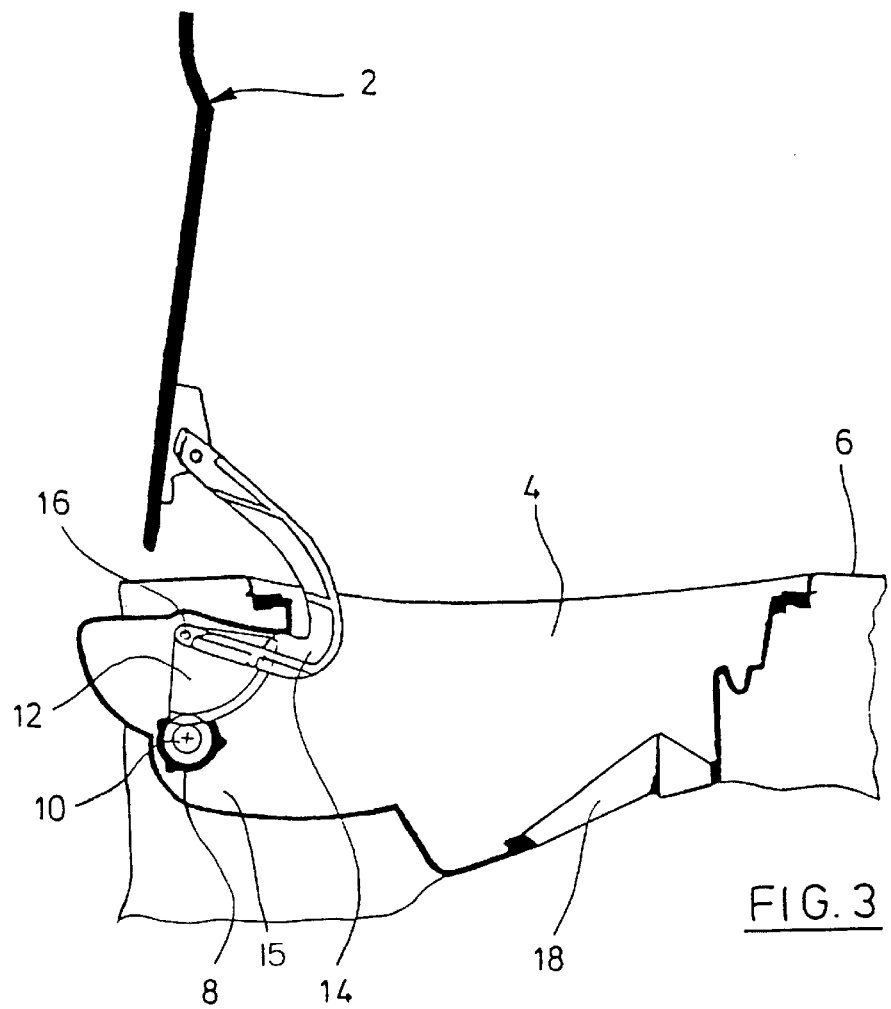
FIG. 3 is a sectioned lateral view of the refueling trough and the refueling flap of FIG. 1 in the open position.

With respect to FIGS. 1, 2, 3 there is shown a refueling trough 4 as a recessed portion in a car body 6, in whose floor there is arranged an opening 18 for a refueling connection piece which for example, may be closed by a rotary lock which is not shown. The refueling flap 2 is hinged by means of an arm 14 to a hinge 16 in the refueling trough 4. The arm 14 runs in the plane of the pivoting movement in a U-shaped manner. One limb of the U-shaped arm 14 projects in the open position of the refueling flap 2 (FIG. 3) out of the opening of the refueling trough 4. In this manner the refueling flap 2 is pivoted out of the region of the opening of the refueling trough 4 so that access is additionally simplified. In the closed position of the refueling flap 2 (FIGS. 1 and 2) the arm 14 lies in an indentation 15 of the refueling trough 4. In the region of the indentation 15 there is fastened to the wall of the refueling trough 4, stationarily with respect to the vehicle body 6, a rotational damper 8 filled with viscous fluid. A pinion 10, by means of the shaft of the rotational damper 8, is in rotational connection with the damper 8, it being noted that (in FIG. 2 the arm 14 is cut away so that the damper 8 and the pinion 10 can be clearly recognized). A tooth segment 12 is rigidly connected to the arm 14 and cooperates with the pinion 10 in that their teeth are in mutual engagement. If the refueling flap 2 is opened the teeth of the tooth segment 12 traverse along the pinion 10 and displaces it into rotational movement so that the rotational damper 8 is actuated. In this manner the opening and closing movement of the refueling flap 2 is dampened. The tooth segment 12 at the same time is fastened to the limb of the U-shaped arm 14 which is hinged in the refueling trough 4.

Obviously, many modifications and variations of the present invention are possible in light of the above teachings. It is therefore to be understood that within the scope of the appended claims, the present invention may be practiced otherwise than as specifically described herein.

I claim:

1. A refueling flap system for use within a refueling trough defined within a vehicle body, comprising:

a refueling flap;

hinge means for pivotally mounting said refueling flap between opened and closed positions with respect to a refueling trough of a vehicle body;

a toothed segment;

an arm having a first end thereof connected to said refueling flap and a second end thereof connected to said toothed segment and said hinge means; and a damper mechanism operatively connected to said toothed segment so as to dampen movements of said refueling flap, through means of said toothed segment and said arm, when said refueling flap is moved between said opened and closed positions.

2. A refueling flap system according to claim 1, wherein:

said damper mechanism comprises a rotational damper which is filled with a viscous fluid and which is rotatably connected to a pinion which, in turn, is enmeshed with said toothed segment of said refueling flap.

3. A refueling flap system according to claim 1, wherein:

said arm has a substantially U-shaped configuration with a first limb of said arm operatively connected to said hinge means so as to be hinged within the refueling trough while a second limb of said arm is adapted to project out of the refueling trough when said refueling flap is disposed at said opened position.

4. A refueling flap system according to claim 3, wherein:

said toothed segment and said arm are formed as an integral one piece structure.

5. A refueling flap system as set forth in claim 3, wherein:

said refueling flap is fixedly attached to second limb of said arm; and said toothed segment is fixedly connected to said first limb of said arm.

6. In combination, a refueling flap system for use within a refueling trough defined within a vehicle body, comprising:

a refueling trough defined within a vehicle body;

a refueling flap;

hinge means for pivotally mounting said refueling flap between opened and closed positions with respect to said refueling trough of a vehicle body;

a toothed segment;

an arm having a first end thereof connected to said refueling flap and a second end thereof connected to said hinge means and said toothed segment; and a damper mechanism operatively connected to said toothed segment so as to dampen movements of said refueling flap, through means of said toothed segment and said arm, when said refueling flap is moved between said opened and closed positions.

7. The combination as set forth in claim 6, wherein:

said damper mechanism comprises a rotational damper which is filled with a viscous fluid and which is rotatably connected to a pinion which, in turn, is enmeshed with said toothed arcuate segment of said refueling flap.

8. The combination as set forth in claim 6, wherein:

said arm has a substantially U-shaped configuration with a first limb of said arm operatively connected to said hinge means so as to be hinged within said refueling trough while a second limb of said arm is adapted to project out of said refueling trough when said refueling flap is disposed at said opened position.

9. The combination as set forth in claim 8, wherein:

said refueling flap is fixedly attached to second limb of said arm; and said toothed segment is fixedly connected to said first limb of said arm.

10. The combination as set forth in claim 9, wherein:

said toothed segment and said arm are formed as an integral one piece structure.

11. In combination, a refueling flap system for use within a refueling trough defined within a vehicle body, comprising:

a vehicle body;

a refueling trough defined within said vehicle body;

a refueling flap;

hinge means for pivotally mounting said refueling flap between opened and closed positions with respect to said refueling trough defined within said vehicle body;

a toothed segment;

an arm having a first end thereof connected to said refueling flap and a second end thereof connected to said hinge means and said toothed segment; and a damper mechanism operatively connected to said toothed segment so as to dampen movements of said refueling flap, through means of said toothed segment and said arm, when said refueling flap is moved between said opened and closed positions.

12. The combination as set forth in claim 11, wherein:

said damper mechanism comprises a rotational damper which is filled with a viscous fluid and which is rotatably connected to a pinion which, in turn, is enmeshed with said toothed arcuate segment of said refueling flap.

13. The combination as set forth in claim 11, wherein:

said arm has a substantially U-shaped configuration with a first limb of said arm operatively connected to said hinge means so as to be hinged within said refueling trough while a second limb of said arm is adapted to project out of said refueling trough when said refueling flap is disposed at said opened position.

14. The combination as set forth in claim 13, wherein:

said refueling flap is fixedly attached to second limb of said arm; and said toothed segment is fixedly connected to said first limb of said arm.

15. The combination as set forth in claim 14, wherein:

said toothed segment and said arm are formed as an integral one piece structure.

16. A refueling flap system for use within a refueling trough defined within a vehicle body, comprising:

a refueling flap;

hinge means for pivotally mounting said refueling flap between opened and closed positions with respect to a refueling trough of a vehicle body;

a toothed segment operatively connected to said hinge means;

an arm having a first end thereof connected to said refueling flap and a second end thereof connected to said toothed segment; and a damper mechanism operatively connected to said toothed segment so as to dampen movements of said refueling flap, through means of said toothed segment and said arm, when said refueling flap is moved between said opened and closed positions.

17. The refueling flap system as set forth in claim 16, wherein:

said damper mechanism comprises a rotational damper which is filled with a viscous fluid and which is rotatably connected to a pinion which, in turn, is enmeshed with said toothed segment.

18. The refueling flap system as set forth in claim 16, wherein:

said arm has a substantially U-shaped configuration with a first limb of said arm operatively connected to said hinge means so as to be disposed within the refueling trough, while a second limb of said arm is adapted to project out of the refueling trough, when said refueling flap is disposed at said opened position.

19. The refueling flap system as set forth in claim 18, wherein:

said refueling flap is fixedly connected to said second limb of said arm; and said toothed segment is fixedly connected to said first limb of said arm.

20. The refueling flap system as set forth in claim 19, wherein:

said toothed segment and said arm are formed as an integral one-piece structure.

* * * * *